J. M. FLANNERY.
BATTERY.
APPLICATION FILED MAY 3, 1916.
1,217,738.
Patented Feb. 27, 1917.
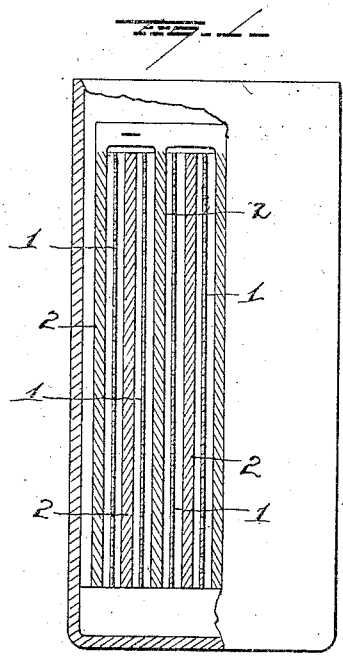
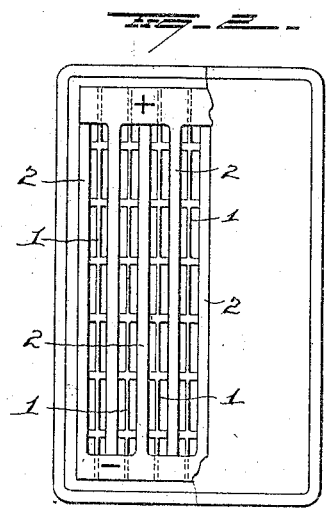
WITNESSES
INVENTOR

UNITED STATES PATENT OFFICE.

JOSEPH M. FLANNERY, OF PITTSBURGH, PENNSYLVANIA.

BATTERY.

1,217,738.  Specification of Letters Patent.  Patented Feb. 27, 1917.

Application filed May 3, 1916. Serial No. 95,129.

*To all whom it may concern:*

Be it known that I, JOSEPH M. FLANNERY, a citizen of the United States, and a resident of Pittsburgh, in the county of Allegheny and State of Pennsylvania, have invented certain new and useful Improvements in Batteries; and I do hereby declare the following to be a full, clear, and exact description of the invention, such as will enable others skilled in the art to which it appertains to make and use the same.

This invention relates to improvements in batteries and is particularly applicable to storage batteries.

It has been found that important factors in the performance and life of an electric accumulator or storage battery, are the adequate circulation of the electrolyte, and extent of exposure of the surface of the active material to the electrolyte. These two conditions are often difficult to attain in practice owing to the limits of available space for the battery,—such for example, as in vehicles and submarines. On the other hand if the plates or electrodes be separated sufficiently to permit the most efficient circulation of the electrolyte and its contact with the greatest possible extent of surface of the active material, the internal resistance of the battery will be increased and the efficiency of the battery will be decreased in proportion to the distance apart which the plates may be disposed.

The object of my invention is to provide means whereby the plates of a storage battery may be sufficiently spaced apart to insure adequate circulation of the electrolyte and contact of the same with a maximum extent of surface of the active material of the plates, and at the same time afford such electrical conductivity through the electrolyte as will obviate excessive internal resistance which would otherwise occur when the plates are spaced apart more than is usually considered maximum distance.

With this and other objects in view, the invention consists in certain novel features as hereinafter set forth and pointed out in the claims.

In the accompanying drawings; Figure 1 is a vertical sectional view partly in elevation illustrating a storage battery embodying my invention, and Fig. 2 is a horizontal sectional view partly in elevation.

I have found in practice that the conductivity of the electrolyte of a storage battery can be sufficiently enhanced when the plates are separated distances which will permit its free circulation and maximum contact with the active material of the plates, to compensate for internal resistance due to such wide separation of the plates, with the use of radio-active material so disposed with respect to the plates that the conductivity of the electrolyte is enhanced between said plates due to ionizing power of the radioactive material. Experiments have shown that while increase of separation of the battery plates will increase the internal resistance of the battery, still these experiments have also demonstrated the fact that such internal resistance is not only balanced and compensated for, but also that an increase of output per unit weight is obtained, with the presence of radio-active material between the plates.

In order to so locate and support the radio-active material that its ionizing power will most effectually reduce the resistance and enhance the conductivity of the electrolyte between comparatively widely separated plates and without unduly contracting the space between the plates, I prefer to employ very thin separators 1, immersed in the electrolyte between the plates 2—2 and spaced from the latter, so that the electrolyte may have unrestricted circulation and contact with the active material of the plates, and utilize these thin separators to support the radio-active material.

The thin separators may be made of material which will not be affected or deteriorated by sulfuric acid or other electrolyte of a strength commonly used in storage batteries, and said separators are provided with numerous perforations.

I prefer to make the separators of celluloid, and the radio-active material may be incorporated in the celluloid during the process of manufacture of the separator, so that said radio-active material shall be distributed throughout the same and be thus retained in such position in the electrolyte between the plates as to ionize the same and thus afford numerous intangible paths of conductivity through the electrolyte and between all exposed faces of the active material throughout the surface areas of the plates. If desired the separator might be made of other material into which the radio-active substance could be incorporated, such for example, as bakelite, glass or pottery ware.

As an example of the radio-active material which may be incorporated into the celluloid or other body material of the separator may be mentioned, a salt of radium, which may be in the form of a soluble chlorid or bromid or an insoluble radium sulfate, and in such quantity that the separator shall contain from one-half micrograin to five micrograins of radium. It will be readily understood that if a soluble radium salt be incorporated into the material of the separator, such salt will be converted into insoluble sulfate when the separator is immersed in the sulfuric acid electrolyte of the battery.

The separators 1 are made radio-active as above described, and constitute radio-active exciters and ionizers immersed in the electrolyte of the battery. Such radio-active exciters and ionizers may if desired be made in the form of envelops to contain the plates of the battery and thus surround the same if desired.

Various forms of radio-active material might be used in making the exciters or ionizers but I prefer to employ a salt of radium, which will be insoluble in the electrolyte of the battery.

I do not wish to limit myself to any specific spacing of the ionizing separators relatively to the battery plates, and may assemble them in the battery in the same manner in which wooden and rubber separators are disposed between the plates in storage batteries now in use.

Having fully described my invention what I claim as new and desire to secure by Letters Patent, is:—

1. An ionizer for electric batteries, consisting of a sheet of material carrying radio-active material.

2. An ionizer for electric batteries comprising a thin sheet of material insoluble in the electrolyte of the battery and carrying distributed radioactive material.

3. An ionizer for electric batteries comprising a sheet of material insoluble in the electrolyte of the battery and having radio-active material incorporated therein.

4. An ionizer for electric batteries comprising a sheet of celluloid and radio-active material incorporated in the celluloid.

5. An ionizer for electric batteries comprising a sheet of celluloid having radio-active material incorporated therein, said sheet having numerous perforations.

6. In a battery, the combination of separated plates, an electrolyte, and radioactive ionizers immersed in the electrolyte between the plates.

7. In a battery, the combination of separated plates, an electrolyte, and thin separators carrying radio-active material, immersed in the electrolyte between the plates.

8. In a battery, the combination with separated plates, an electrolyte, and separators consisting of celluloid carrying incorporated radioactive material and immersed in the electrolyte.

In testimony whereof, I have signed this specification in the presence of two subscribing witnesses.

JOSEPH M. FLANNERY.

Witnesses:
 WM. GANLEY,
 MAX HARTENHEIM.